May 7, 1946.  C. E. CUSHMAN  2,399,793
CONTROL CABLE REGULATOR
Filed April 21, 1945  2 Sheets-Sheet 1
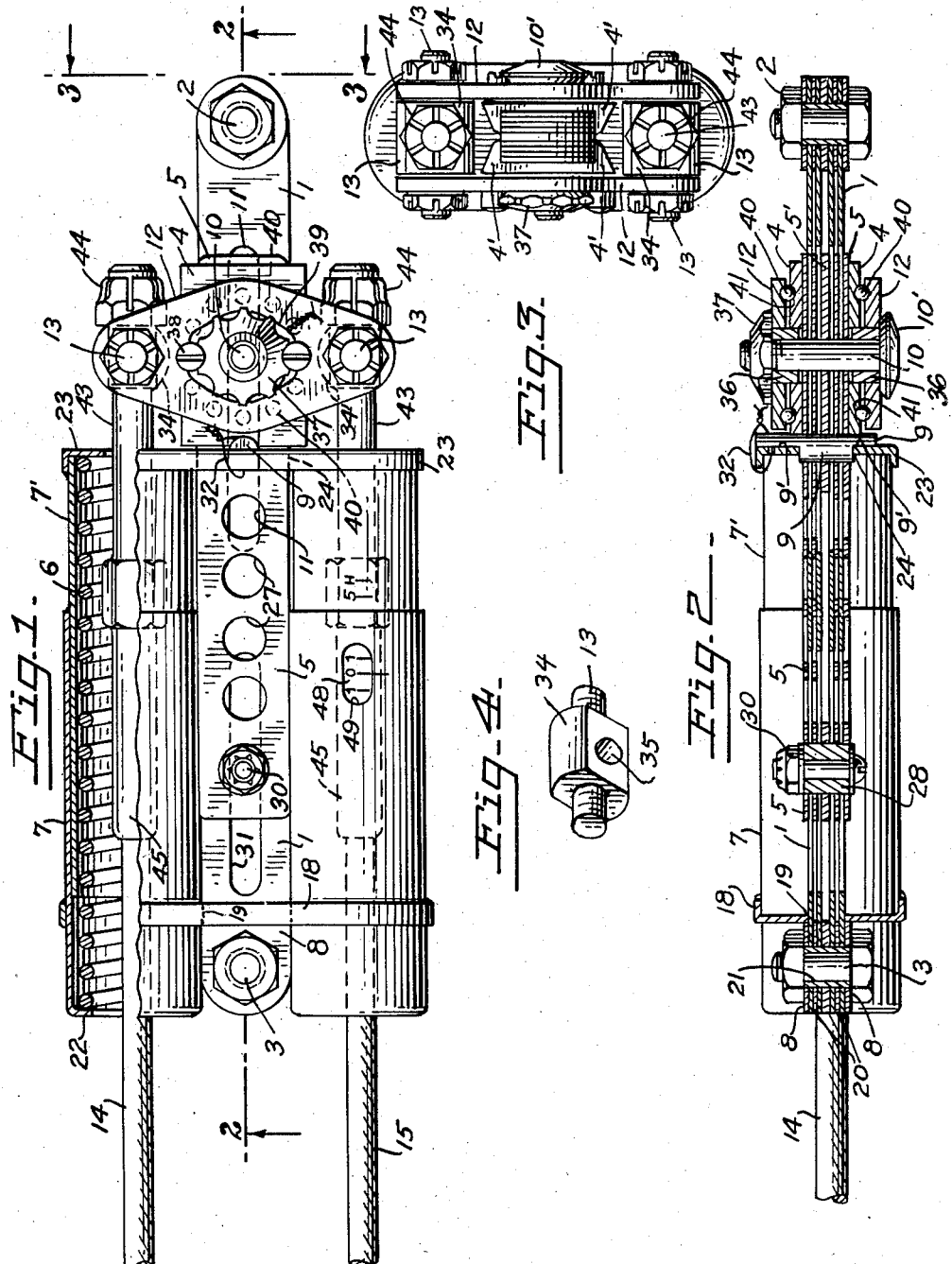
INVENTOR.
CLIFFORD E. CUSHMAN
BY
ATTORNEY May 7, 1946.  C. E. CUSHMAN  2,399,793
CONTROL CABLE REGULATOR
Filed April 21, 1945　　2 Sheets-Sheet 2
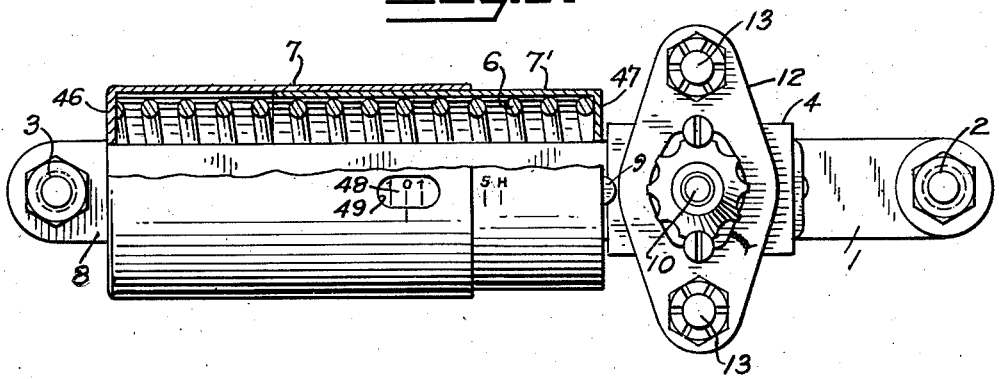
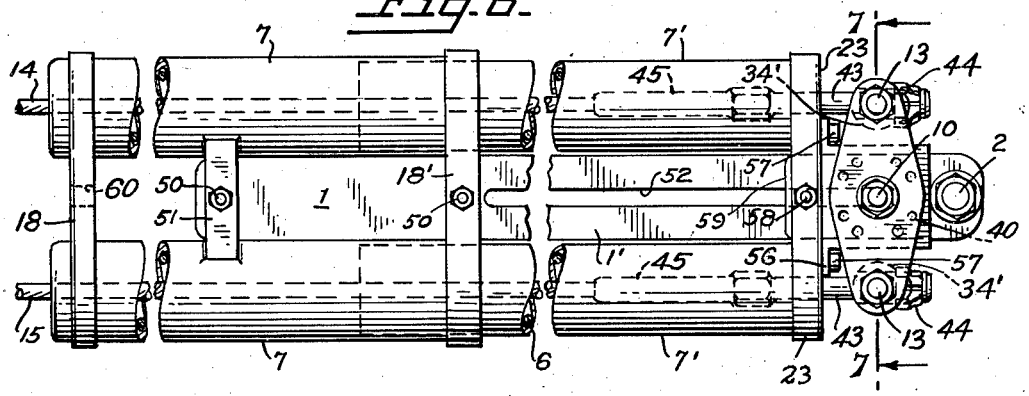
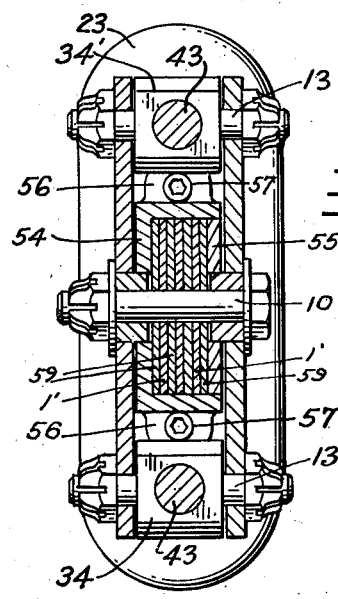
INVENTOR.
CLIFFORD E. CUSHMAN
BY
ATTORNEY Patented May 7, 1946

2,399,793

UNITED STATES PATENT OFFICE 2,399,793

CONTROL CABLE REGULATOR

Clifford E. Cushman, Roscoe, Calif., assignor to Sturgess, Inc., Glendale, Calif., a corporation of California Application April 21, 1945, Serial No. 589,605

16 Claims. (Cl. 74—501)

This invention relates to control cable tension regulators of the type shown in assignees' patent No. 2,280,106 entitled "Cable tension controller," and has for its principal object a simplified construction of such a device, also one which will be lighter for the same work capacity. Other features and advantages will appear in the following description and accompanying drawings.

In the drawings,

Fig. 1 is a plan view of my improved control cable tension regulator showing a two spring design, and with portion of one spring barrel broken away to reveal the internal arrangement.

Fig. 2 is a longitudinal cross section of Fig. 1 taken along the line 2—2 of Fig. 1.

Fig. 3 is an end view of Fig. 1 as seen from the line 3—3 thereof, but with anchor bolt omitted for clarity.

Fig. 4 is a detached perspective view of one of the cable attaching yoke bolts.

Fig. 5 is a plan view of a single spring type control cable tension regulator incorporating some of my improvements.

Fig. 6 is a broken plan view of an extra long two spring design as used for relatively great variations in the cable regulating requirements.

Fig. 7 is a cross section of the device of Fig. 6 taken along the line 7—7 of Fig. 6.

Before describing the drawings in detail it may be stated that like the device of the prior patent mentioned the present device is what is known as a "dead end" design as contrasted with the "in line" type, and also preferably employs a plurality of interleaved friction plates or strips as a brake to lock out the spring operation upon a working pull being applied to either control cable, but in the present construction the friction strips themselves, or at least one set of them, functions as the frame of the device and thus dispenses with a material amount of weight, a feature of importance on aircraft construction wherein many of these devices are used on each craft—there being normally one for every pair of control cables used, and this includes both air control surfaces as well as engine and other devices and parts which must be moved back and forth or adjusted during flight.

While Figs. 1 and 5 show respectively the two and one spring type, and Figs. 2, 3, and 4 show the details, it should be noted that the friction leaf assembly complete with its rocker to the outer ends of which the cables are attached, are identical for both models. Also that for the extra long model of Figs. 6 and 7 the friction leaf assembly operates the same as the one for Fig. 1 and varies only in the particular form of the pressure plates which embrace the friction leaves or strips, and that one of the plates is secured to the spring housing tube assembly. Also that the spring housing tubes are longer and project beyond the ends of the fixed (relatively) set of friction strips, whereas in the shorter model of Fig. 5 the reverse is true. However, the relative length of the springs and spring tubes in relation to the friction brake strips all depends on the amount of compensating or regulating travel required for a particular service together with the spring force to be exerted on the control cables over such a length of travel.

The present embodiment of control cable tension regulating means may be said to comprise a series of superimposed elongated thin (preferably metal) strips 1 with a transversely extending bolt 2, 3 passing through opposite ends of the strips for anchoring the strips to a support, while slidably embracing the long strips is a clamping carriage 4 which carries a series of thin elongated plates 5 interleaved with the longer strips 1 to slide back and forth on them with the carriage, one of the directions of sliding being opposed by one or more coiled springs 6, preferably enclosed in telescopic housings 7, 7' supported by the group of long strips 1 and reacting at opposite ends respectively between a stop 8 carried by the strips and a stop 9 at the slidable carriage, the carriage itself being stopped from sliding off the end of the strips by a bolt 10 passing through a slot 11 in the strips to determine and limit its travel. A rocker cam 12 pivoted to the bolt and extending normally at right angles across the carriage 4 is provided with means at its opposite ends as at 13 for securing the ends respectively of the two control cables 14 and 15 and which in the two spring models may extend straight through the springs and spring covering tubes as shown in Fig. 1, or in the single spring model along the opposite outer sides of the tube 7, 7'. The rocker cam is so arranged that when rocked slightly in either direction by unequal pull on the cables 14 and 15, the cam will force the sides of the carriage inwardly and clamp all of the interleaved long friction strips and plates together to at once frictionally lock them in contact against any further relative sliding movement until substantial equilibrium of cable pull is reestablished and the rocker cam again extends at right angles across the strips or longitudinal axis of the device, and whereupon the tension of the spring or springs is again freed to take up slack or yield to excessive tension caused by heat and out of proportion expansion of the fuselage or body of the aircraft or any other reason and thus "regulate" the tension of the control cables until the next operative pull is put on either cable whereupon the above cycle is repeated.

In the showing of Figs. 1 and 2 the two outer sections 7 of the telescopic tubes which enclose the springs are secured in laterally spaced relation by a transversely extending bridge plate or sheet metal stamping 18 soldered or brazed in place and formed with an oblong opening at 19 for the long strips 1 to extend through and be stopped from pulling back by means of the stop plates 8 which together with the spacing washers 20 between each of the strips 1 are all secured together by the end mounting or anchor bolt 3 which passes through aligned holes in the ends of the strips 1 which is preferably bushed as at 21 so that the bolt can be taken out in installing the device without the plates being pulled through opening 19 in the bridge plate by the force of the springs 6. It should be noted that in Fig. 1 the springs are shown as about half compressed by the pull of the cables.

The outer ends of the spring tubes 7 are turned inward as at 22 to seat and receive the thrust of the outer ends of the springs.

The two inner telescopic sections 7' of the spring covering tubes are secured in proper spaced relation by a sheet metal stamping or head bridge plate 23 preferably soldered or brazed in place and against which the inner ends of the springs react, and which head plate is also formed with a rectangular hole 24 to slidably pass the entire two sets of interleaved strips 1 and 5 and is stopped against the inner end of the carriage or rather against a pin 9 which projects through aligned holes in friction plates 5 and aligned slots 11 in friction strips 1 all so that the force of the compression springs will tend to move the carriage 4 and its interleaved plates 5 along the longer strips 1 away from bolt 3 toward bolt 2.

It should be noted that stop pin 9 bears in a half-round notch 9' in the inner ends of carriage walls 4 and is cut away to its center line at opposite ends to present a flat seat against the forward surface of head plate 23. This is to locate the pressure of the springs definitely in the center of the carriage and rocker cams 12.

Friction plates 5 are preferably drilled with a row of lightening holes 27 and the outer ends are provided with a bushing 28 surrounding a bolt 30 to hold them in proper relation, yet free to slide in their interleaved relation with strips 1. The bolt 30 being accommodated through aligned slots 31 in strips 1.

It may here be stated that all nuts on bolts are either of some approved lock-nut construction or castellated and wired through a slot in the bolt as indicated, and the same holds good for screw heads, also pressure distributing pin 9 is cross-drilled at one end and wired to plate 23 as indicated at 32, as no chance is taken that anything can get out of adjustment or become lost.

The carriage 4 comprises relatively thick metal walls or plates of channel form when viewed endwise as in Fig. 3. The channel legs 4' freely embrace the outer edges of the entire group of interleaved plates and strips 5 and 1 yet the confronting edges of the legs do not touch so that they are always free to transmit pressure upon opposite sides of the group of plates and strips when the rocker cams 12 are tilted, and it is for this reason that the central friction plate 5' is made somewhat thicker so that the legs of the confronting channel carriage walls will overlap it yet permit their separation along the center line at all times.

The rocker cams 12 comprise two substantially oval shaped plates with holes at their outer ends to receive the pivot ends 13 of cable attaching yokes 34 which are each provided with a transversely extending hole 35 centered over the end respectively of the spring covering tubes 7' when the rockers are at right angles with the longitudinal center line of the device. Hole 35 is to receive one of the control cables or its attaching rod as will later be described.

The rocker cams 12 are pivoted to the carriage walls 4 on bushings 36 through which bolt 10 passes. This bolt has a large head 10' (see Figs. 2 and 3) and castellated nut 37 overlying the bushings and rockers, and the head and nut are suitably locked against turning by screws 38 wired in place as by wires 39 after the desired adjustment has been made.

The cam effect produced upon rocking plates 12 slightly about the axis of bolt 10 is secured by two circular rows of balls 40 arranged in confronting countersunk depressions or holes 41 formed respectively in the confronting surfaces of the carriage walls 4, and in the rocker cams 12. With the adjustment of nut 37 of bolt 10 such that there will be no pressure upon the interleaved friction plates and strips when the rocker cams are standing at right angles to the longitudinal axis of the regulator, but tilting them either way by an unbalanced pull on either of the control cables 14, 15 will force all the balls simultaneously against the inclined walls of the countersunk depressions 41 and thereby at once compress the walls of the carriage and all of the interleaved plates and strips into tight frictional contact to effectually brake any further sliding movement of the carriage.

The countersunk hole surfaces are preferably hardened to minimize wear, but as the total pressure is distributed over about ten or more balls per side, the unit pressure is low as it takes very little to clamp the interleaved plates of the area shown to effectively lock out the springs. Suitable material for the friction elements has been found to be stainless steel for strips 1 and bronze for plates 5, as it insures uniformity of results at all times without danger of change of frictional value through corrosion.

In connecting the cables to the yokes, suitable connecting rods 43 may be used to pass through the holes 35 of the yokes 34 and have a suitable lock nut 44 screwed to their outer ends, the opposite ends of the connecting rods may have any desired thimble 45 for connecting the cables 14, 15 either detachably or permanently as may be desired.

In mounting the device it is anchored from a bolt at 2 of a length to make the required connection to rigid structure or suspended from a shackle on a cable or link from this point, and it is also desirable to additionally support and/or laterally brace the device from the point 3.

In regard to the single spring model of Fig. 5, as stated, the friction assembly is the same as described for the two spring model of Fig. 1 except that the assembly of friction strips instead of passing through rectangular openings in bridge plates 18 and 23 pass similarly through openings in heads 46 and 47 respectively provided on the outer ends of telescopic tubes 7 and 7'.

Both models are provided with setting graduations 48 along the inner of the telescopic tubes to be read preferably through an opening 49 in the outer tube. This is for installation adjustment for initially adjusting suitable turnbuckles provided on the cables (not shown) so as to provide for the required movement in both directions to take up slack and pay out under excessive strain from shrinkage (relative) of the cables. It is of course understood that any of the models or designs may be made of any length of spring or power of spring dependent on the service requirements.

In the variation of structure shown in Figs. 6 and 7 the design is the two spring type with two extra long telescopic spring tubes with the sections numbered 7 and 7' and they are similarly spaced by bridge pieces 18 and 23, and the forward ends of the outer sections by an additional bridge piece 18' to stabilize them, for in the actual devices constructed the tube sections were each about a foot long.

The longer friction strips 1' extend through bridge piece 18' and are anchored at their outer ends by a bolt 50 passing through them and the bridge piece and through a rigid block 51 welded or otherwise permanently secured to the adjacent walls of the outer tube sections 7. These strips 1' are provided with a single long slot 52 which extends for the length of the total compensating adjustment required and embraces the rocker cam bolt 10.

In this long design, while the main anchoring point is at the forward end of the friction strips at 2, the support of the rear end is made at the rear bridge piece 18 and for which purpose a hole 60 is provided to receive a bolt or other suitable mounting connection.

The clamping carriage in the present construction differs from that of Fig. 3 in having but one thick extra deep channel member 54 which receives all of the friction strips in its open side and is closed by a thick floating side plate 55 also received within the channed 54 as clearly shown in Fig. 7. The main carriage member 54 is provided with bolting lugs 56 secured directly to the head bridge piece 23 as by bolts or screws 57. A bolt 58 also extends transversely through bridge piece 23 and through the long slot 52 of the strips 1' to further assure centralizing of them with the spring covering tubes, and the bolt also passes through holes in the interleaved friction plates 59 (which correspond to the plates 5 of Fig. 2) which extend from the outer end of the carriage to a point just inside of bridge piece 23 as indicated.

In Fig. 6 the cable attaching yokes 34' are indicated as having only the outer side flattened to receive the lock-nut 44 of the cable attaching rods 43.

All the other features not described specifically for the design of Fig. 6 are the same as described for the preceding figures.

It will be evident to anyone skilled in the art that various modifications in the details of construction may be made within the spirit of the invention and as intended to be covered in my appended claims. While I show my improved tension regulator operating on control cables, it is to be understood that it will operate the same way with control wires, ropes, chains, or rods, or any mixed series of such tension elements, and therefore the use herein of the word cable or cables is to be taken to include any such tension elements the tension of which is to be controlled in the manner described.

I therefore claim:

1. In a control cable tension regulator of the character described, locking out means comprising a plurality of elongated juxtapositioned strips, means adapted for anchoring said strips as a unit to a support, a plurality of plates interleaved with said strips, a carriage supported by said strips engaging said plates for moving them along the strips as the carriage is moved, means on said carriage guiding it along said strips, and means responsive to an operating cable pull for clamping the strips and plates into frictional contact to prevent movement of said carriage.

2. In a control cable tension regulator of the character described, locking out means comprising a plurality of elongated juxtapositioned strips, means adapted for anchoring said strips as a unit to a support, a plurality of plates interleaved with said strips, a carriage engaging said plates for moving them along the strips, said carriage provided with relatively movable walls at opposite sides of the stack of strips and plates, and means responsive to an operating cable pull for moving the walls relatively toward one another for clamping the strips and plates into frictional contact to prevent movement of said carriage.

3. In a control cable tension regulator of the character described, locking out means comprising a plurality of elongated juxtapositioned strips, means adapted for anchoring opposite ends of said strips as a unit to a support, a plurality of plates interleaved with said strips, a carriage embracing the stack of strips and plates and engaging said plates for moving them along the strips, and means responsive to an operating cable pull for clamping the strips and plates into frictional contact to prevent movement of said carriage.

4. In a structure as set out in claim 2, the means for moving the walls of the carriage relatively toward one another comprising a rocker pivotally mounted on the carriage and a face cam between the rocker and one of the walls of the carriage.

5. In a structure as set out in claim 2, the means for moving the walls of the carriage relatively toward one another comprising a pair of rockers pivotally mounted on opposite sides respectively of the carriage and a face cam between each rocker and one of the walls of the carriage.

6. A cable tension regulator comprising a plurality of elongated strips in juxtaposition and provided with means at one end for securing them as a unit to a support, a carriage embracing and slidable along said strips, a plurality of plates interleaved with said strips and carried by said carriage, spring means resisting one way movement of said carriage along said strips, means adapted for connecting a pair of cables to said carriage for pulling same to slide in opposition to said spring means, and means operated by an unbalanced pull on said cables clamping said strips and plates together within said carriage to thereby lock the carriage against sliding along said strips during said unbalanced pull.

7. A cable tension regulator comprising a plurality of elongated strips in juxtaposition and provided with means at one end for securing them as a unit to a support, a carriage embracing and slidable along said strips, a plurality of plates interleaved with said strips and carried by said carriage, spring means resisting one way movement of said carriage along said strips, means adapted for connecting a pair of cables to said carriage for pulling same to slide in opposition to said spring means comprising a rocker pivoted to said carriage and to the opposite ends of which rocker the cables respectively connect, and cam means operated by said rocker when tilted by an unbalanced tension on said cables arranged for clamping said strips and plates together within said carriage to thereby lock the carriage against sliding along said strips during said unbalanced pull.

8. A cable tension regulator comprising a plurality of elongated strips in juxtaposition and provided with means at one end for securing them as a unit to a support, a carriage slidable along said strips, a plurality of plates interleaved with said strips, said carriage having relatively loose side walls embracing the assemblage of strips and interleaved plates and engaging said plates to carry same with it as the carriage is moved, a rocker pivoted to and extending transversely of said carriage, means at the opposite ends of the rocker adapted for connecting one each of a pair of control cables, and a series of balls between the rocker and its adjacent carriage side wall seated in countersunk depressions in the confronting surfaces to function as a face cam when said rocker is tilted to thereby force the walls of the carriage relatively inward, and resilient means urging said carriage in a direction opposed to pull on said cables.

9. A cable tension regulator comprising a plurality of elongated strips in juxtaposition and provided with means at one end for securing them as a unit to a support, a carriage slidable along said strips, a plurality of plates interleaved with said strips, said carriage having relatively loose side walls embracing the assemblage of strips and interleaved plates and engaging said plates to carry same with it as the carriage is moved, a pair of aligned rockers pivoted to and extending transversely at opposite sides of said carriage, means at the opposite ends of the rockers adapted for connecting one each of a pair of control cables, and a series of balls between each rocker and its adjacent carriage side wall seated in countersunk depressions in the confronting surfaces to function as a face cam when said rockers are tilted to thereby force the walls of the carriage relatively inward, and resilient means urging said carriage in a direction opposed to pull on said cables.

10. In a structure as set out in claim 9, the means for connecting the cables to the ends of the rockers comprising a yoke block between each pair of aligned ends of the rockers provided with extending pivots passing through the rockers, and a hole through the yoke block aligned with the cables respectively.

11. In a structure as set out in claim 6, said spring means comprising a coiled compression spring enclosed in a pair of telescopic tube sections and reacting against the opposite ends respectively of said sections to telescopically extend the sections, one of said sections anchored against outward movement to said strips, and the other section reacting against said carriage to urge it along the strips as set out.

12. In a structure as set out in claim 6, said spring means comprising a coiled compression spring enclosed in a pair of telescopic tube sections and reacting against the opposite ends respectively of said sections to telescopically extend the sections, one of said sections anchored against outward movement to said strips, and the other section reacting against said carriage to urge it along the strips as set out, said elongated strips extending through both telescopic sections, means anchoring the outer ends of the strips adjacent the outer end of one of said sections, and means engaging the carriage by the end of the other section for urging it along the strips as set out.

13. In a structure as set out in claim 6, said spring means comprising two helically coiled compression springs positioned along opposite sides of said elongated strips, telescopic tubular sections enclosing each spring with the opposite ends of the springs reacting against the sections to extend them, bracket means connecting the two outermost tubes together and anchored adjacent the outer end of said strips, bracket means connecting the remaining tubes together formed to slidably straddle said strips and engage said carriage to urge it along the strips as set out.

14. In a structure as set out in claim 6, said spring means comprising two helically coiled compression springs positioned along opposite sides of said elongated strips, telescopic tubular sections enclosing each spring with the opposite ends of the springs reacting against the sections to extend them, bracket means connecting the two outermost tubes together and anchored adjacent the outer end of said strips, bracket means connecting the remaining tubes together formed to slidably straddle said strips and engage said carriage to urge it along the strips as set out, a pin being positioned between said carriage and the last mentioned bracket means to localize the operating pressure.

15. In a structure as set out in claim 6, said spring means comprising two helically coiled compression springs positioned along opposite sides of said elongated strips, telescopic tubular sections enclosing each spring with the opposite ends of the springs reacting against the sections to extend them, bracket means connecting the two outermost tubes together and anchored adjacent the outer end of said strips, bracket means connecting the remaining tubes together formed to slidably straddle said strips and engage said carriage to urge it along the strips as set out, one wall of said carriage secured directly to said last mentioned bracket means.

16. In a structure as set out in claim 6, said carriage comprising a pair of side plates at opposite sides of the stack of strips and interleaved plates and inwardly extending legs along the edges of the plates embracing the edges of the strips and plates, and a bolt extending through the side plates and interleaved plates and through a slot in said strips.

CLIFFORD E. CUSHMAN.